DEFENSIVE PUBLICATION

T866,023

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1437

Tx
~~2326~~
~~x2325~~
~~x2337~~

673,959

LINEAR POLYMERS OF 2,2-DIMETHYL-5-AMINOPENTANOL-1

James Cuthbert Martin, Sarah Joelle Rush, and Russell Gilkey, all of P.O. Box 511, Kingsport, Tenn. 37662

Filed Oct. 9, 1967. Published Sept. 30, 1969
Int. Cl. C08g *17/06, 17/08, 17/13*
U.S. Cl. 260—77.5
No Drawing. 16 Pages Specification Highly polymeric linear condensation polymers are prepared from 2,2-dimethyl-5-aminopentanol-1 and at least one bifunctional carboxy compound or derivative thereof. Examples of carboxy compounds or derivatives thereof are cycloaliphatic dicarboxylic acid, cycloaliphatic dicarboxylic acid ester, aromatic dicarboxylic acid, aromatic dicarboxylic acid ester, carbonic acid, and derivatives of carbonic acid. Exemplary is the product of the condensation of diphenyl terephthalate with 2,2-dimethyl-5-aminopentanol-1 in the presence of dibutyl tin oxide. This and other products of the invention are amorphous, non-crystallizable polymers possessing a low processing temperature and a high use temperature. The polymers are useful in the production of molded objects, sheeting and film. The polymers also can readily be applied as hot-melt adhesives.

HDA
added